United States Patent [19]
Sado et al.

[11] 3,956,744
[45] May 11, 1976

[54] NUMERAL OUTPUT SYSTEM FOR CIRCULATING REGISTER

[75] Inventors: Ichiro Sado; Mitsuaki Seki, both of Tokyo, Japan

[73] Assignee: Canon Kabushiki Kaisha, Tokyo, Japan

[22] Filed: Jan. 3, 1974

[21] Appl. No.: 430,568

[30] Foreign Application Priority Data
Jan. 10, 1973 Japan.................................. 48-5775
Jan. 11, 1973 Japan.................................. 48-6201
Jan. 12, 1973 Japan.................................. 48-6339
Jan. 18, 1973 Japan.................................. 48-8122

[52] U.S. Cl.............................. 340/324 R; 178/30; 235/92 EA; 340/336
[51] Int. Cl.²....................................... G08B 5/36
[58] Field of Search...................... 340/324 R, 336; 235/92 EA

[56] References Cited
UNITED STATES PATENTS
3,416,133  12/1968  Hunkins et al...................... 340/154
3,571,577  3/1971  Kubo et al...................... 235/92 EA
3,749,896  7/1973  Munt................................ 340/324 R
3,812,489  5/1974  Hirano et al. .................. 235/92 EA

*Primary Examiner*—David L. Trafton
*Attorney, Agent, or Firm*—Fitzpatrick, Cella, Harper & Scinto

[57] ABSTRACT

A display (or printing) device is dynamically capable of displaying an output numeral from a register in a time division manner. The display device is controlled by a control circuitry adapted to provide a blank time between display times of adjacent digit places in a group of display units so that the decrease of display brightness, the display flicker, an overlapped display and instantaneous display disturbance and so on may be prevented. The control circuitry further adapts to suppress insignificant zero which is not to be displayed by the group of display units.

29 Claims, 7 Drawing Figures

FIG. 3

NUMERAL OUTPUT SYSTEM FOR CIRCULATING REGISTER

BACKGROUND OF THE INVENTION

1. Field of the Invention

The present invention relates to an improvement of a system for deriving the numeral output stored in a register to dynamically drive in a time-division manner a numeral display device in which a plurality of digit display units are arrayed in parallel, and more particularly a system for deriving the numeral output from a circulating register which system may eliminate the abnormal light emission between the adjacent digit places (overlapped display), beat and noise.

2. Description of the Prior Art

In a dynamic display system, a numeral consisting of a plurality of digits may be displayed in a time-division manner by a display device consisting of a plurality of digit display units, and not only the content which is to be displayed but also the digit place in the display device at which the content of the output information is to be displayed are selected during a unit digit time. Therefore a digit is displayed at one digit place in the display device only when the digit to be displayed and the digit place at which the digit is to be displayed are simultaneously selected. In general in the drive system of the type described, the digit place selection in the display device is made from one unit digit time to another, and the display unit at the selected digit place is driven over the full unit digit time. The drive system of the type described is fully disclosed, for instance, in French patent No. 1350840, FIG. 5.

It has been found that the digit place selection pulse is superposed upon the next digit-place-selection pulse and the abnormal light emission occurs, when the fall time of the digit place selection pulse is longer and when the circuit has a high floating capacitance between the wires. This abnormal light emission is clearly observed particularly in case of a seven-bar-segment type display tube.

The foregoing problem is removed in accordance with the present invention which relates to a system for deriving the output stored in a circulating register to display or print a numeral in an electronic desktop calculator, and more particularly a system capable of preventing the decrease in brightness and flicker in a dynamic display system of the type displaying a numeral stored in a register in a series time division scheme.

In the conventional system for deriving the numeral output from a register, a numeral information stored in N-digit shift register are sequentially transferred into a buffer register, and the numeral information stored in the buffer register is transferred into a decoder during one digit time (generally four bit periods). The decoder drives a specific digit place in a numeral display device during one digit time so that the time-division display may be accomplished. Therefore, the display duty of the display device is only 1/N. One digit time is dependent upon the circulation speed of the shift register. Therefore the circulation speed of the register must be increased as the operation speed of a computer is increased. As a result one digit time is shortened, thus it is difficult to obtain the sufficient time for driving the display device. This results in the decrease in brightness and flicker.

BRIEF SUMMARY OF INVENTION

In view of the above, one of the objects of the present invention is to provide a system for deriving a numeral output from a register which system may extremely increase the drive time of a display device without causing the decrease in brightness and flicker even when an operation speed is increased as much as possible. Briefly stated, according to the present invention, one digit information stored in a register is transferred into a buffer register independently of the circulation speed of the register. The digit information stored in the buffer is held during more than one digit time of the register so that the drive time of a display device may be extended and the reliable dynamic display may be ensured.

Further according to the present invention, while one digit information is stored in the buffer register, the next digit information to be transferred into the buffer register is identified as to whether it is an insignificant zero or not. Therefore, a highly efficient system for driving a display device may be provided. According to the present invention, the content stored in the register is applied from the most significant digit to a zero suppression circuit so that the digits are in turn identified from the least significant digit as well as the sequence of the arithematic operation processing, like a display system disclosed in, for instance, U.S. Pat. No. 3,449,726. Therefore, the display control may be accomplished in a simple and reliable manner.

Still further according to the present invention, a zero suppression circuit is very simple as compared with a system disclosed in Japanese Patent Publication No. 18111/1969 in which a zero suppression circuit requires a counter and a coincidence circuit.

Furthermore, according to the present invention a timing pulse generator generates control pulses whose repetitive rate is different from the number of digits of a register whereby the additional redundant digits of a circulating register may be unnecessary and one digit information may be transferred into a buffer register each time when the content in the circulating register is circulated. Moreover, one digit time during which one digit information is transferred from the circulating register into the buffer register is utilized as a blank time so that the instantaneous display disturbance may be prevented. Thus, the system of the present invention is compact in size and inexpensive in cost. The drive system in accordance with the present invention is also advantageously used in a printing device.

BRIEF DESCRIPTION OF THE DRAWINGS

Figure 3:
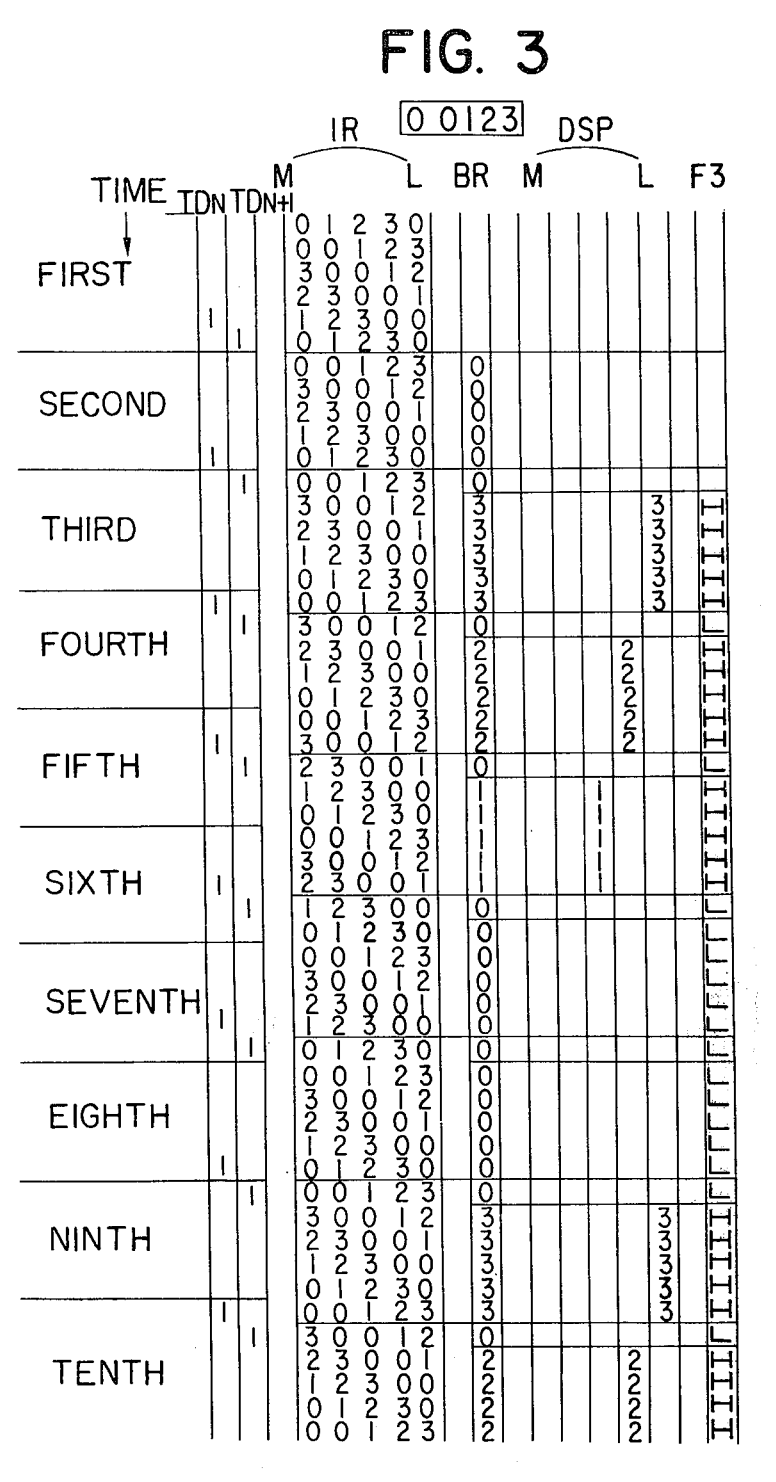

FIG. 3 is a table used for the explanation of the mode of operation thereof;

DESCRIPTION OF THE PREFERRED EMBODIMENT

Figure 1:
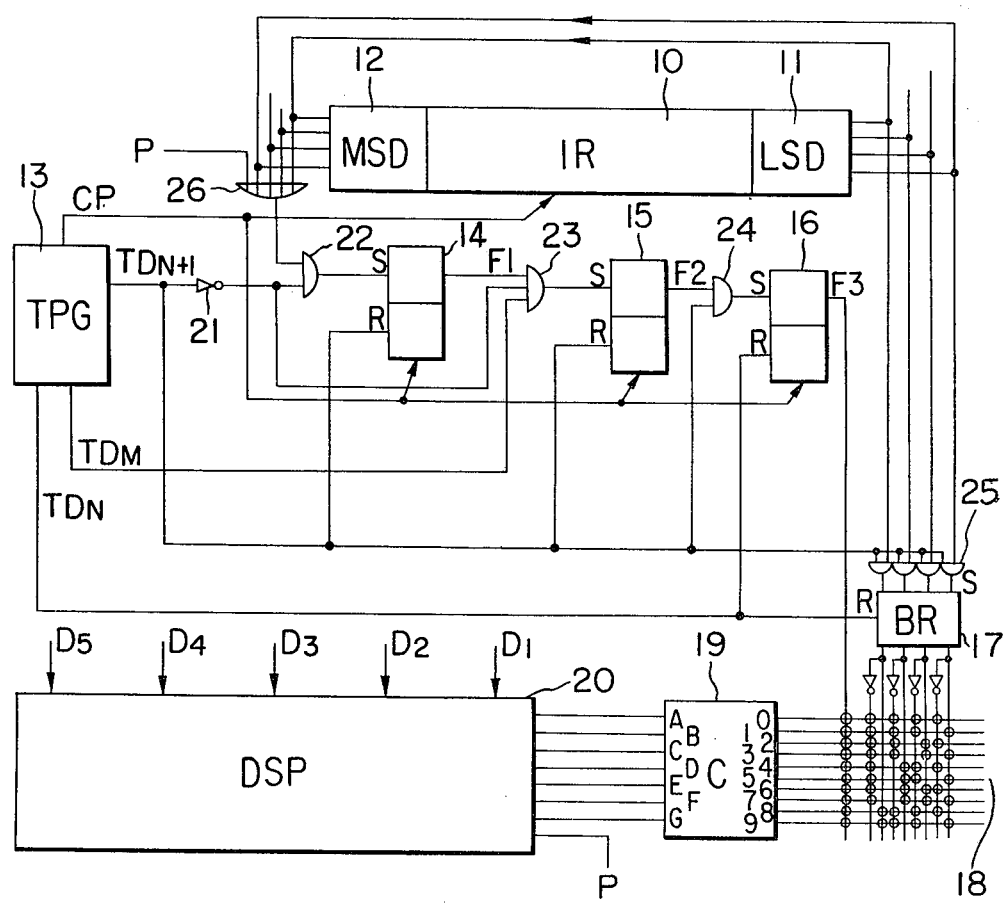
FIG. 1 is a diagram of one preferred embodiment of the present invention.

Referring now to FIG. 1, a numeral to be displayed is stored in a circulating shift register 10 with the least significant digit 11 and the most significant digit 12. A timing pulse generator 13 is adapted to generate timing pulses whose pulse repetitive rate is different from the number of digits of the shift register 10. A zero suppression circuit comprising flip-flops 14, 15 and 16 is adapted to identify whether there is any insignificant zero in the data stored in the shift register 10. A buffer register 17 is adapted to hold one digit information transferred from the register 10 during a predetermined time so that a display drive time may be extended, thereby preventing a flicker and a decrease of the brightness. The decimal output of a diode matrix decoder 18 is converted into the segment selection signals by an encoder 19. The decoder 18 and/or encoder 19 will be referred to as "a converter" for converting the binary information into the visible digital information.

Figure 4:
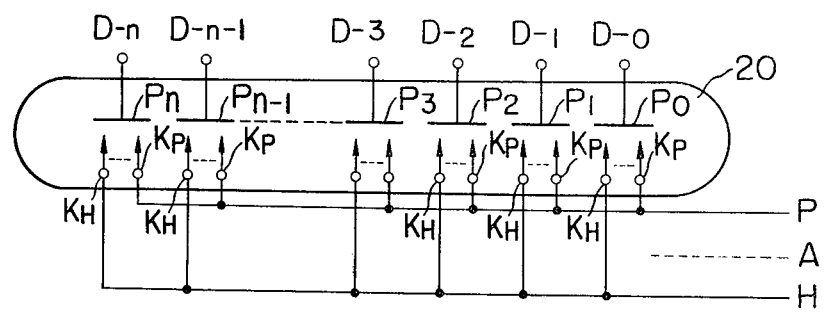
FIG. 4 is a schematic view of a multi-digit display tube.

Each digit is driven in a time-division manner in a display device 20 so that the dynamic display may be effected. It is preferable for the present invention to use a multi-digit display tube of the type (See FIG. 4) in which a plurality of digit display units are sealed in parallel in a glass tube, a plasma display device, a liquid crystal display device, a light emitting diode display device or conventional discharge display tubes (sold under the trademark "Nixie tube") or fluorescent display tubes. The present invention is especially adapted for use with a multi-digit display tube which tends to produce overlapping, flicker and noise due to the interference between the adjacent digits when the tube is driven dynamically in a time-division manner or for use with a liquid crystal display device or the like whose frequency response is very poor. However, it should be noted that the present invention is not limited to the display devices described above.

In accordance with the present invention, it is possible to obtain reliable operation of the display or printing device because a certain digit information stored in the buffer register 17 is held during a time interval longer than at least a time assigned to each digit as described hereinbefore so that during this time interval an insignificant zero, that is a zero which should not be displayed may be identified. In the instant embodiment, one digit information stored in the register 11 is transferred into and held in the buffer register 17 during at least one word time so as to extend the display time, and the process for detecting an insignificant zero during one word time will be in detail described hereinafter. It should be noted that any other suitable zero suppression circuit may be used instead of the zero suppression circuit shown in FIG. 1.

It is now assumed that the register 10 has five digit places with bits stored in parallel and digits stored in series and that the numerals "00123" be held in the register 10 in the order named from the most significant digit position 12 to the least significant digit position. In this case the two higher-order digit numerals "00" are insignificant zeros that should not be displayed.

Figure 2A:
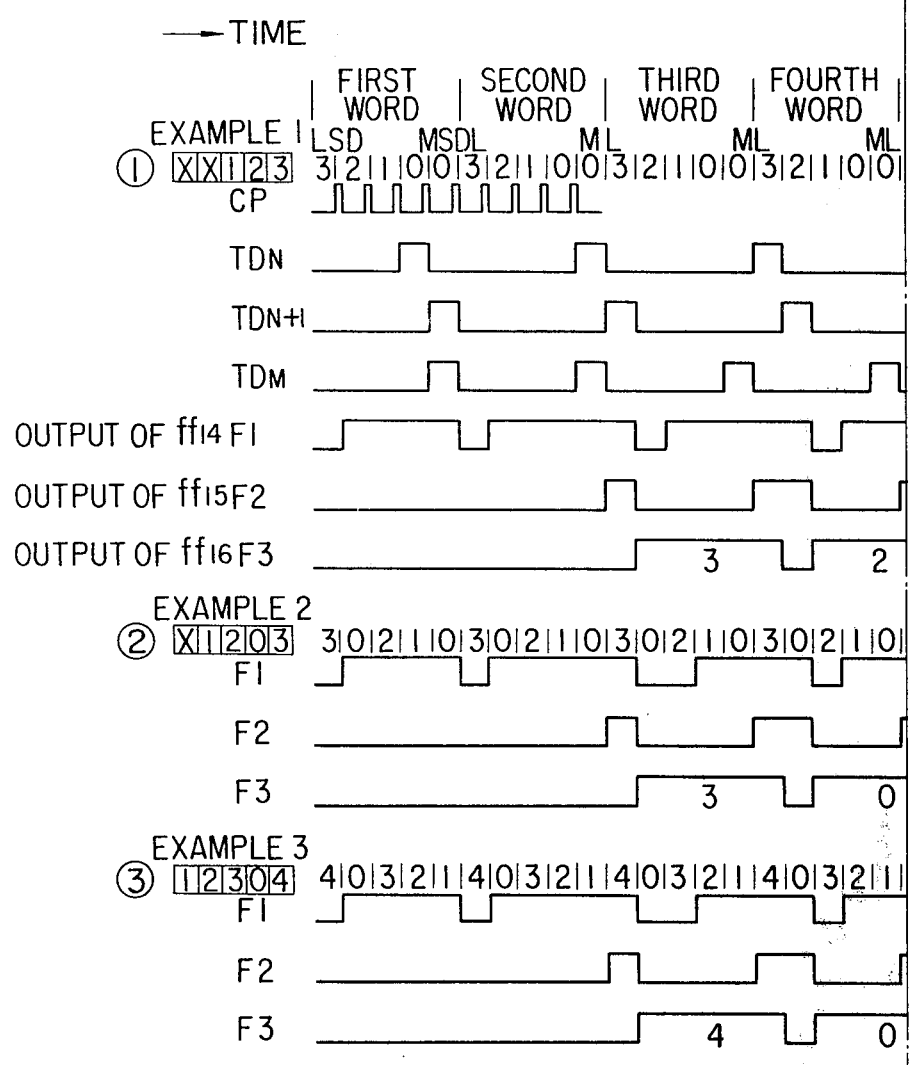
FIGS. 2a and 2b are a timing chart used for the explanation of the mode of operation thereof.
Figure 2B:
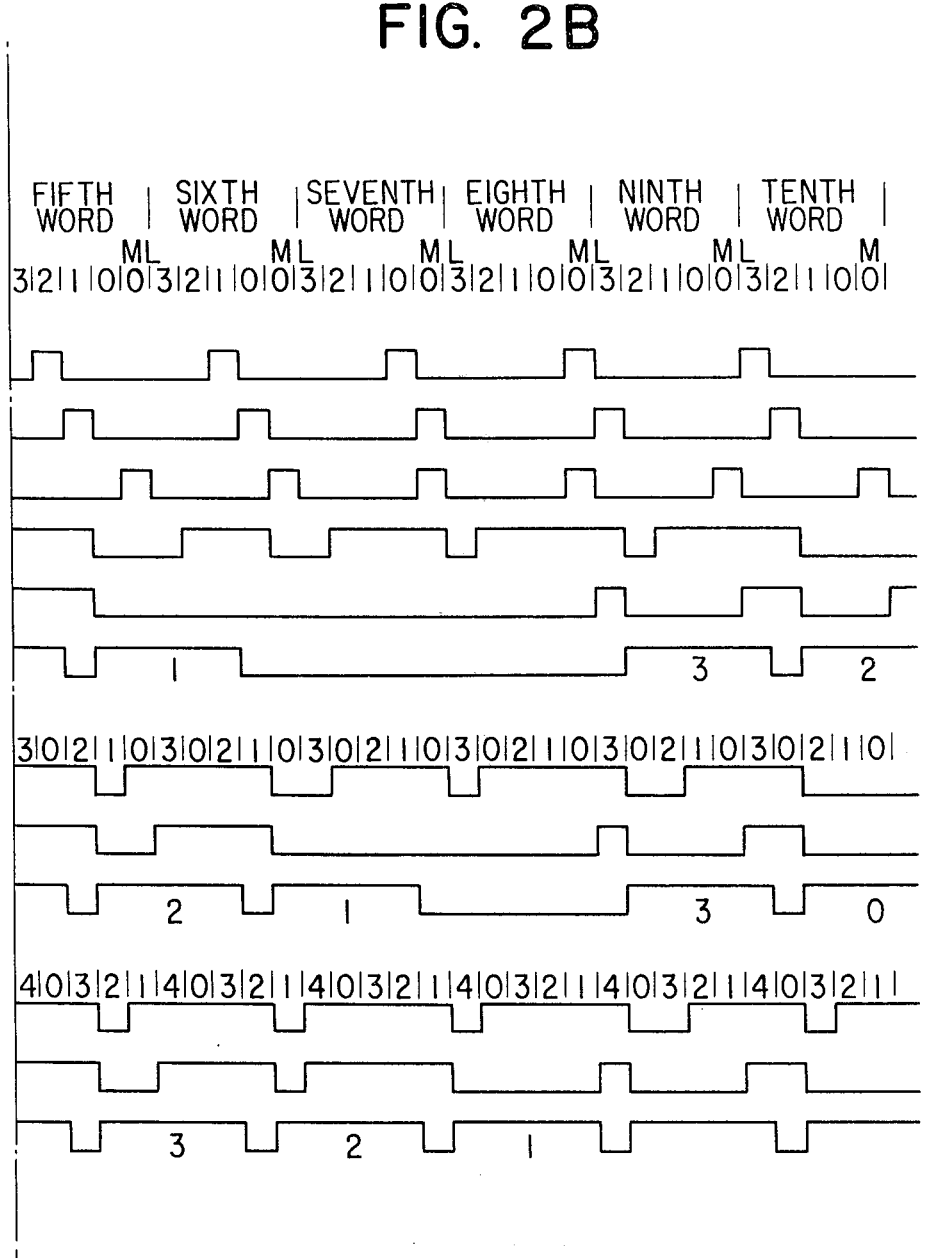

The timing pulse generator 13 generates the clock pulses CP and control pulses for TD-M, TD-N and TD-N+1 as shown in FIGS. 2A and 2B. TD-M is a time when the data in the most significant digit position of one word or numeral is shifted into the LSD place. TD-M rises to a high level during one digit time.

In addition to the clock pulse CP and TD-M which are synchronized with the circulation frequency of the register IR and independently thereof, the signal TD-N representing the timing of every sixth digit, which is larger than the number of digits of the register IR by one and the signal TD-N+1 which lags behind the signal TD-N by one digit are produced as shown in FIGS. 2A and 2B.

As shown in FIG. 2, at the initial state the signals TD-N+1 and TD-M are coincidently generated, and the timing when signals TD-N+1 and TD-M are coincidently generated is referred to as a "first word". At the last digit time in the first word, the data ("0" in the instant embodiment) shifted and stored in the LSD place of the register IR is transferred into the buffer register BR when an AND gate 25 is opened with the timing of the signal TD-N+1. The buffer register BR has been already cleared in response to the clear signal TD-N which was generated at the time before the signal TD-N+1. The data "00123" are passed in the order named through the circulation loop and one input of AND gate 22 and applied to the flip-flop 14. To the another input of the AND gate 22 is also applied the signal $\overline{TD-N+1}$. When the signal TD-N+1 rises to a high level during one digit time, the AND gate 22 is closed so that no data may be applied to the flip-flop 14 which is the input stage of the zero suppression circuit. While the AND gate 22 is closed, one digit information is transferred from the register IR into the buffer register BR, which is referred to as "writing".

When the least significant digit "3" of the numeral "00123" which is not zero is applied to the AND gate 22 at the timing of the first word, the signal TD-N+1 does not exist so that the AND gate 22 is opened. Therefore, as shown in FIGS. 2A and 2B Example 1 the flip-flop 14 is set in response to either of the rising bits of the binary coded signal "0011" of the decimal numeral (3) and in synchronism with the trailing edge of the clock pulse CP. The flip-flop 14 keeps providing the high-level output until it is reset in response to the trailing edge of the signal TD-N+1. At the end of the first word, the data are again stored in the register IR in the same order as first, and the second word is started. In the second word, the flip-flop 14 is set in the same manner as described above with reference to the first word. Further at the end of the first word, the AND gate 26 is opened in response to the signal TD-N+1 so that "0" in the MSD place stored in the buffer BR is cleared in response to the trailing edge of the clear signal TD-N.

At the end of the second word, the conditions for setting the flip-flop 15 are satisfied. That is, the flip-flop 15 is so arranged that it is set in response to the trailing edge of the most significant digit signal TD-N which is generated when the signal TD-N+1 is not present after the flip-flop 14 has been set. Therefore, at the end of the second word (the start of the third cycle) the flip-flop 15 is set. In this second word, the signal TD-N+1 has no chance to rise to a high level so that no digit information in the register IR is transferred into the buffer register BR, and the display of all digits has not been started yet.

In the third word, the content "3" in the LSD of the register IR is transferred into the buffer register BR in response to the signal TD-N+1. During this digit time the flip-flop 15 keeps providing a high-level set signal so that an AND gate 24 is ready to be opened. The flip-flop 16 is set in response to the trailing edge of the signal TD-N+1, and the flip-flop 15 also is set in response to the trailing edge of the signal TD-N+1. The set output F3 of the flip-flop 16 is applied to the decoding lines of the decoder matrix 18 to provide an AND condition. Therefore when the content of the buffer register is "3", the binary coded signal "0011" is decoded into the decimal "3", which may be displayed by the display device 20. As described above, the content of the LSD place in the register IR is "3", and kept stored in the buffer register BR and the flip-flop 16 provides the output F3, and the display device displays "3" at its least significant digit place. In this case, due to the time-division dynamic drive, the least significant digit pulse D-1 is applied to the display device 20. The buffer register BR is so arranged to hold its content during at least one word time.

In other words, the content stored in the buffer register in response to the signal TD-N+1 is kept until it is reset in response to the clear signal TD-N, and the buffer register BR holds the content during at least one word (five digits) time period from the time when the signal TD-N'1 appears to the time when the control signal TD-N appears. The digit pulse D-1 is of course applied during at least one word time. In the conventional dynamic display device, the dynamic one-digit turn-on time is one digit time (four-bit time), but according to the present invention, the display tube may be turned on during N digit time (one word time) where N is the number of digits of the register IR. Therefore the dynamic display without flicker can be accomplished for a sufficient time without fail. The present invention is especially adapted for use with a multi-digit display tube in which a plurality of discharge display elements are constructed as one unit because the longer the display time of one digit, the longer the time during which the voltage is applied to each digit display unit. Furthermore it becomes possible to provide sufficient blank time between the voltage pulses to be applied sequentially, so that the overlap, flicker, noise and so on may be eliminated in the multi-digit display tube. This is the most remarkable feature of the present invention.

The present invention is also used with a printing device so that sufficient printing energy may be provided. Furthermore the present invention may eliminate the use of a special buffer memory incorporated in the conventional printing device. This blank time may be more positively utilized in such a way that it may be used for making heat emanate from or cooling a thermal head which is heated due to printing. After the third word has been completed, the fourth word is started.

In the fourth word, the content "3" stored in the buffer register BR in the third word is cleared in response to the trailing edge of the signal TD-N, and the AND gate 25 is opened during the time TD-N+1 so that the next least significant digit "2" stored in the register IR is transferred into the buffer register BR. The flip-flop 16 is reset in response to the trailing edge of the signal TD-N.

At the end of the last digit time of the third word, the signal TD-M rises to a high level, and in response to the trailing edge of the signal TD-M, the flip-flop 15 is set in the manner described hereinbefore. After one digit time, the signal TD-N+1 is applied to the reset input terminal and falls after further one digit time. In response to this fall the flip-flop 15 is reset. That is, the flip-flop 15 is set during two digits time for LSD and LSD+1. In response to the output F2 of the flip-flop 15 and the signal TD-N+1 the AND gate 24 is opened and the flip-flop 16 is set again in response to the fall of the signal TD-N+1. The one digit time when the flip-flop 16 is reset is a blank time which may be utilized to prevent the overlapped display, flicker, and noise. This is the important feature of the present invention.

In the fifth word, the third digit from the LSD stored in the register IR is "1". The same steps as the previous words are repeated so that the output of the flip-flop 15 may be kept at a high level during three digits time for the LSD, LSD+1 and LSD+2. That is, the number of digits to be displayed may be stored in the terms of digit time. However the content in the fourth digit place from the LSD place in the register IR is zero so that the flip-flop 14 is not set in the fifth word, which is different from the steps of the previous four words. That is, this zero must be suppressed and must not be displayed.

The flip-flop 16 is reset in response to the output F2 of the flip-flop 15 so that the display of the digit numeral "1" is started. At the end of the fifth word (at the start of the sixth word), the output of the flip-flop 15, which had been set in case of the step of the previous four words, does not rise to a high level, thus the time when the flip-flop 15 was set in the fourth word, that is the third digit time is identified as the last significant digit to be displayed.

In the sixth word, the flip-flop 14 is set in response to the content "3" in the LSD of the register IR as well as the case of the first word. The flip-flop 16 which has been set is reset in response to the fall of the signal TD-N which appears at the third digit time. The content "1" stored in the buffer BR is cleared in response to the signal TD-N, and the content of the next digit place, that is "0" in the fourth digit place (insignificant zero which must not be displayed) is stored in the buffer BR in response to the signal TD-N+1. Since the output F3 of the flip-flop 16 is at a low level, the display signals are not transmitted from the decoder 18 so that the insignificant zero in the fourth digit place is suppressed in the display device 20.

Figure 5:
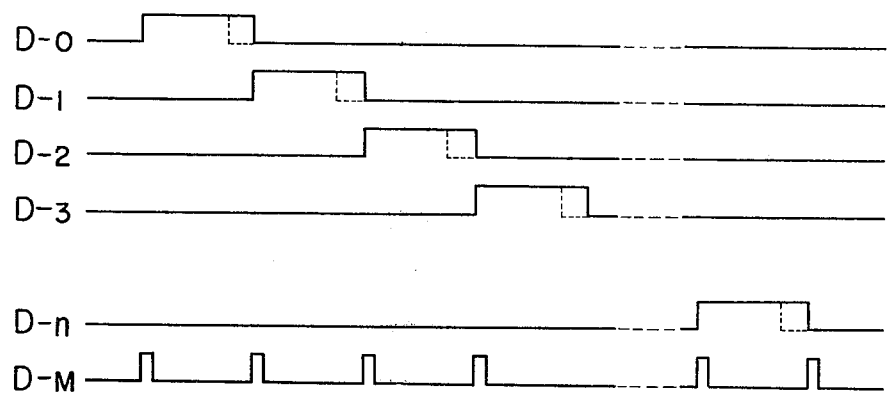
FIG. 5 is a timing chart of digit pulses.

In the 7th word (which is similar to the first word and the first cycle is completed with the prior six words), the content "0" in the fourth digit place stored in the buffer BR is cleared in response to the clear signal TD-N, and the content "0" in the fifth digit place is stored into the buffer register BR in response to the signal TD-N+1. Since the flip-flop 16 does not provide the output F3, the display is not made. That is, the display of the digit "0" in the fifth digit place, that is, in the MSD place is suppressed. The above one cycle is repeated so that the insignificant zeros in the MSD and next MSD places may be suppressed while only the significant digits 123 are displayed. The digit pulses D-1, D-2, ... and D-5 must continue during at least one word time, and it is preferable but not necessary to provide one digit time blank between the adjacent digit pulses D-0 to D-n in synchronism with the output of the encoder 19 as indicated by the broken lines in FIG. 5. The digit pulses D-1 to D-5 are applied regardless of the digit places at which the zero suppression take place, but it is also possible in a simple manner to apply the output F3 of the flip-flop 16 to a circuit which applies the digit pulses to the display device 20 so as to suppress an insignificant zero. In other words, it is not necessary to control by the decoder the output of the zero suppression circuit of the instant embodiment.

In the instant embodiment, the output F3 of the flip-flop 16 is applied to all of the output lines 0-9 of the decoder 18 as an AND condition, but it is to be understood that the output F3 may be applied to only one output line 0.

In FIGS. 2A and 2B, timing charts of the other numerals are shown at ②and③. In case of ③, the numeral is 1 2 3 0 4 so that there is no zero suppression.

As described above, according to the instant embodiment, while one digit is being displayed during one word time, the digit in the next digit place is being detected whether it is a significant digit or not so that it is suppressed when it is displayed in the next word time if it is detected as an insignificant digit. Therefore, the present invention has the distinct advantage that the output time of the digit information may be held N times longer than the conventional devices. Therefore, the display is not adversely affected at all even when a register with four-bit in parallel and digits in series is used in order to increase the operation speed. Furthermore there is another advantage that the digit in each digit place is identified whether it is an insignificant zero or not when a numeral is displaced from its least significant digit so that the system of the present invention may immediately follow the transient data change.

In the instant embodiment, the digits stored in the register IR are sequentially derived from the least significant digit, but it is to be understood that if timing for obtaining the contents of the digit places in the register IR is suitably selected, the numeral may be displayed at random order and the zero suppression is also possible. When one digit is stored in the buffer register for display, the remaining digits are sequentially identified whether they are to be displayed or not while said one digit is being displayed so that the zero suppression is possible regardless of the order of deriving the contents of the register IR. In this respect, the system of the present invention is superior as compared with the system disclosed in Japanese Utility Model Publication No. 22182/1972.

As described in the above publication in case a numeral may be displaced by a multi-digit display tube if the digits of the numeral are selected in the random order and the digit pulses are applied, the overlap display, flicker and noise may be eliminated. Furthermore according to the present invention the zero suppression with a blank time may be accomplished by only three flip-flops so that the system may be much simplified.

As described hereinbefore, one digit time required for transferring one digit information from the circulating register to the buffer register is used as a blank time so that the instantaneous disturbance operation of the display may be eliminated in case of the transfer. Therefore, the numeral displayed by the display device may be very clearly observed.

Figure 6:
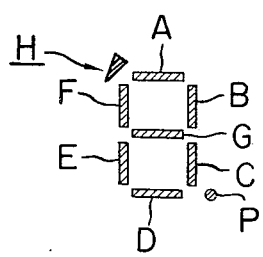
FIG. 6 is a view illustrating a seven-bar-segment numeral display pattern.

FIG. 6 shows seven bar segments for display of numerals.

Abnormal light emission between the adjacent digit display units may be prevented in this case also as well as the embodiment mentioned above, and the deviation of printed words may be eliminated. Thus the present invention provides a very preferable numeral output system for a circulating register.

What is claimed is:

1. A numeral output system for a register comprising:
   a first register having a plurality of digit states for storing therein at least binary coded output numeral information;
   a second register for storing sequentially therein one digit of the binary coded output numeral information from said first register;
   output means for visually displaying the binary coded output numeral information of said second register; and
   means providing a blanking time between adjacent binary coded output numeral signals which are transferred from said second register to said output means, for blanking the visual display of said output means during intervals between said adjacent signals.

2. A numeral output system for a register according to claim 1 further comprising:
   means for detecting an insignificant zero in said first register and to suppress said insignificant zero, whereby said zero is not displayed on said output means.

3. A numeral output system for a register according to claim 2 wherein said insignificant zero detecting means is included in said blanking means.

4. A numeral output system for a register according to claim 1 further comprising:
   control means for controlling the storage of one digit of the binary coded output numeral information from said first register in said second register during at least more than one digit time.

5. A numeral output system for a register according to claim 1 wherein said output means comprises a multi-digit numeral display device.

6. A numeral output system for a register according to claim 1 wherein said first register comprises a plurality of digit stages each being connected in series together and having a four bit parallel configuration, and said first register has a circulating loop.

7. A numeral output system for a register according to claim 2 wherein said insignificant zero detecting means includes at least one flip-flop circuit.

8. A numeral output system for a register according to claim 4 wherein said control means includes a timing pulse generator and gate means.

9. A numeral output system for a register comprising:
   a first register having a plurality of digit stages for storing therein at least binary coded output numeral information;
   output means for visually displaying the binary coded output numeral information of said first register; and
   means for developing a control signal for every digit, said control signal having a first signal level during which transferring of the output numeral information to said output means is inhibited and having a second signal level during which transferring of the output numeral information to said output means is permitted.

10. A numeral output system for a register according to claim 9 further comprising:
    means for detecting an insignificant zero in said first register and to suppress said insignificant zero, whereby said zero is not displayed on said output means.

11. A numeral output system for a register according to claim 10, wherein said insignificant zero detecting means is included in said control signal developing means.

12. A numeral output system for a register according to claim 9 further comprising:
    a second buffer register for storing sequentially therein one digit of the binary output numeral information from said first register, the output signal of said second register being controlled by the control signal from said control signal developing means.

13. A numeral output system for a register according to claim 9 wherein said output means comprises a multi-digit numeral display device.

14. A numeral output system for a register according to claim 9 wherein said output means comprises a printer.

15. A numeral output system for a register according to claim 12 further comprising:
control means for controlling the storage of one digit of the binary coded output numeral information from said first register in said buffer register during at least more than one digit time.

16. A numeral output system for a register according to claim 15 wherein said control means includes a timing pulse generator and gate means.

17. A numeral output system for a register according to claim 9 wherein said first register comprises a plurality of digit stages each being connected in series together and having a four bit parallel configuration, and said first register has a circulating loop.

18. A numeral output system for a register comprising:
a first register having a plurality of digit stages and a circulating loop for storing therein and circulating therethrough at least binary coded output numeral information;
a second register having an input terminal which is connected to an output terminal of said first register for storing therein one digit of the binary coded output numeral information from said first register during at least more than one digit time, said second register being disposed outside of said circulating loop;
control means for controlling the storage of one digit of the binary coded output numeral information from said first register in said second register during at least more than one digit time; and
output means for visually displaying the binary coded output numeral information of said second register.

19. A numeral output system for a register according to claim 18 further comprising:
means for detecting an insignificant zero in said first register while one digit of the binary coded numeral information from said first register is being stored in said second register.

20. A numeral output system for a register according to claim 18 wherein said first register comprises a plurality of digit stages, each being connected in series together and having a four bit parallel configuration.

21. A numeral output system for a register according to claim 18 wherein said control means includes a timing pulse generator and gate means.

22. A numeral output system for a register according to claim 18 wherein said output means comprises a multi-digit numeral display device.

23. A numeral output system for a register according to claim 18 wherein said output means comprises a printer.

24. A numeral output system for a register according to claim 19 wherein said insignificant zero detecting means develops a control signal for every digit, said control signal having a first signal level during which transferring of the output numeral information to said output means is inhibited and having a second signal level during which transferring of the output numeral information to said output means is permitted.

25. A numeral output system for a register comprising:
a first register having a plurality of digit stages for storing therein at least binary coded numeral output information which is shifted from the upper significant digit thereof toward the lower significant digit and circulated therethrough;
a second register for storing therein one digit of the binary coded numeral output information from said shift register;
means for controlling the storage, in turn, of one digit of the binary coded output numeral information from said first register into said second register in accordance with a sequence of digit positions from the lower significant digit toward the upper significant digit and to store said one digit during at least more than one digit time;
means for detecting an insignificant zero in turn from the lower significant digit of said first register, said insignificant zero detecting means including at least three flip-flops; and
output means interconnected to said insignificant zero detecting means and said second register for visually displaying the binary coded output numeral information in said second register.

26. A numeral output system for a register according to claim 25 wherein said first register comprises a plurality of digit stages each being connected in series together and having a four bit parallel configuration.

27. A numeral output system for a register according to claim 25 wherein said output means comprises a multi-digit numeral display device.

28. A numeral output system for a register according to claim 25 wherein said output means comprises a printer.

29. A numeral output system for a register according to claim 25 wherein said control means comprises a timing pulse generator and gate means.

* * * * *